UNITED STATES PATENT OFFICE.

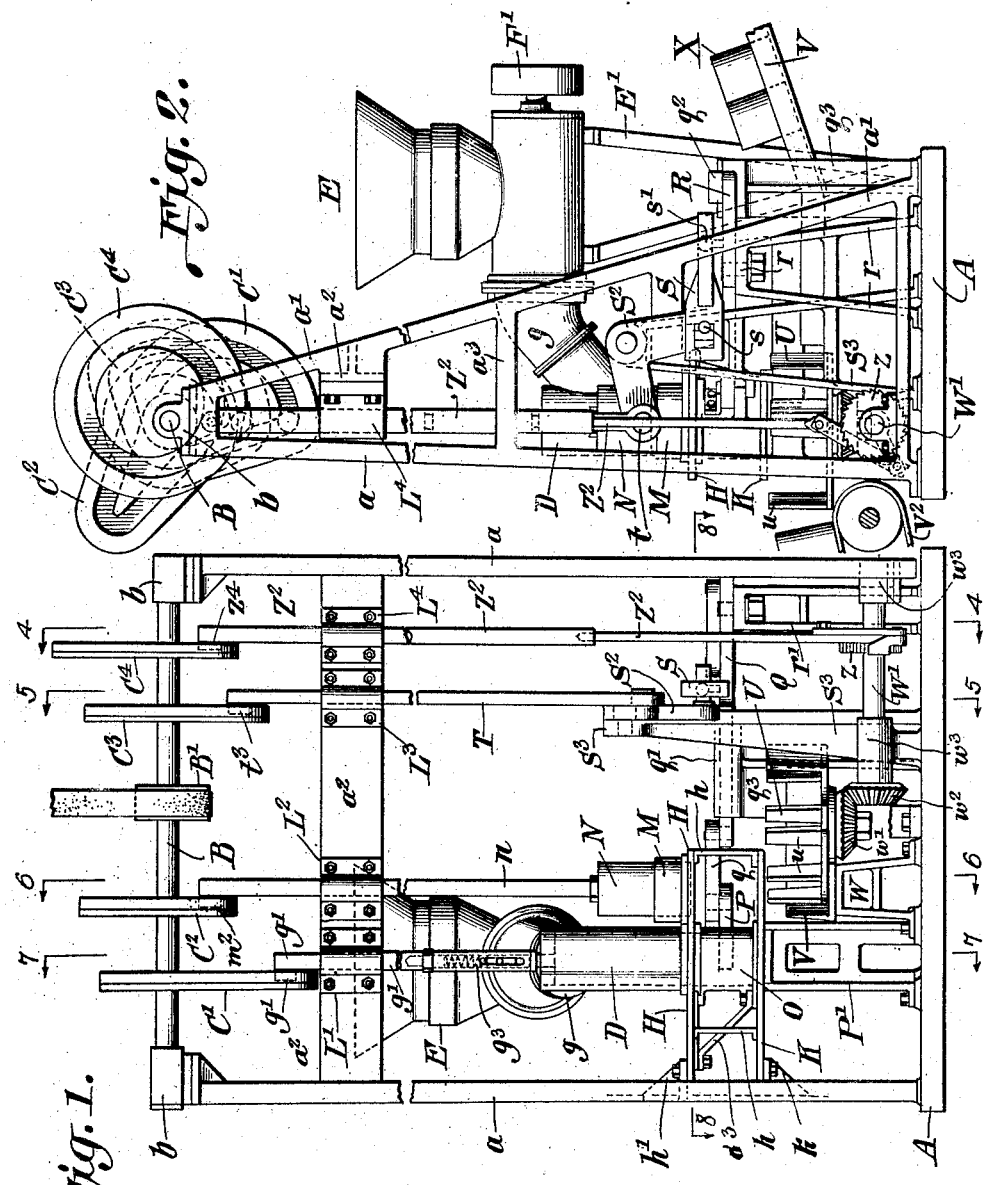

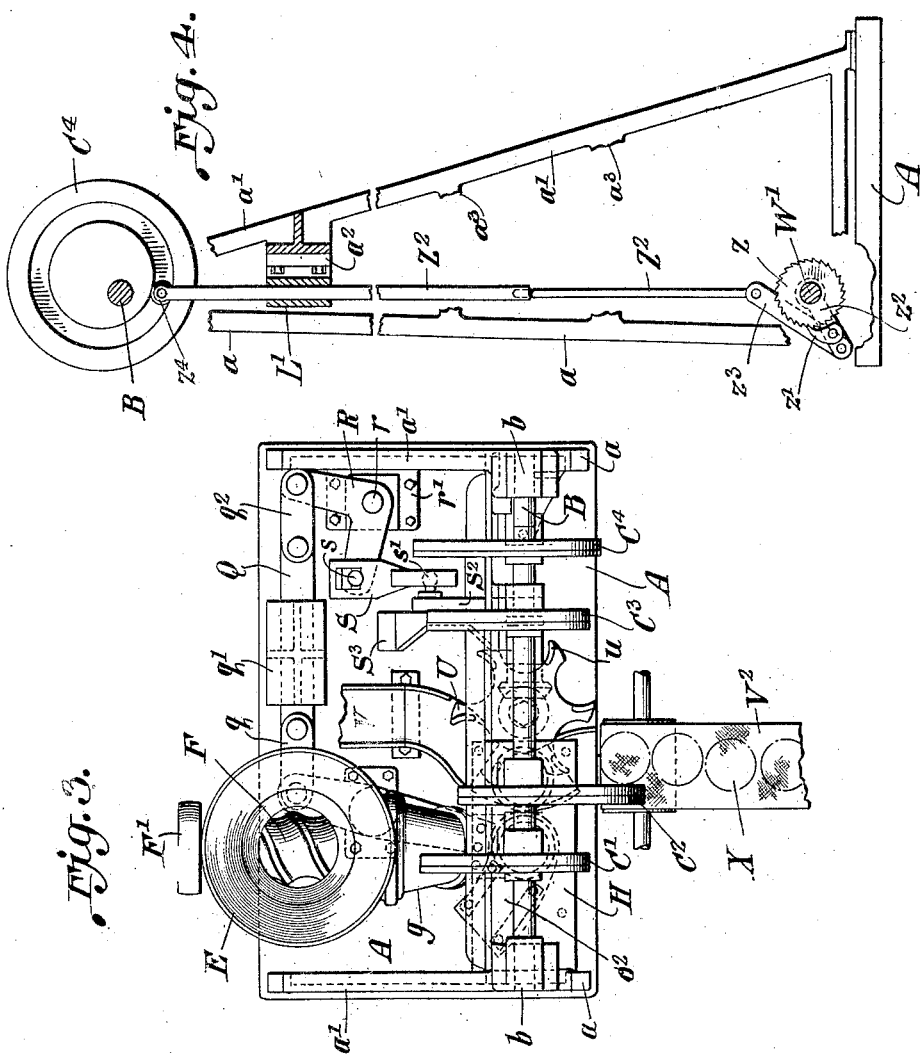

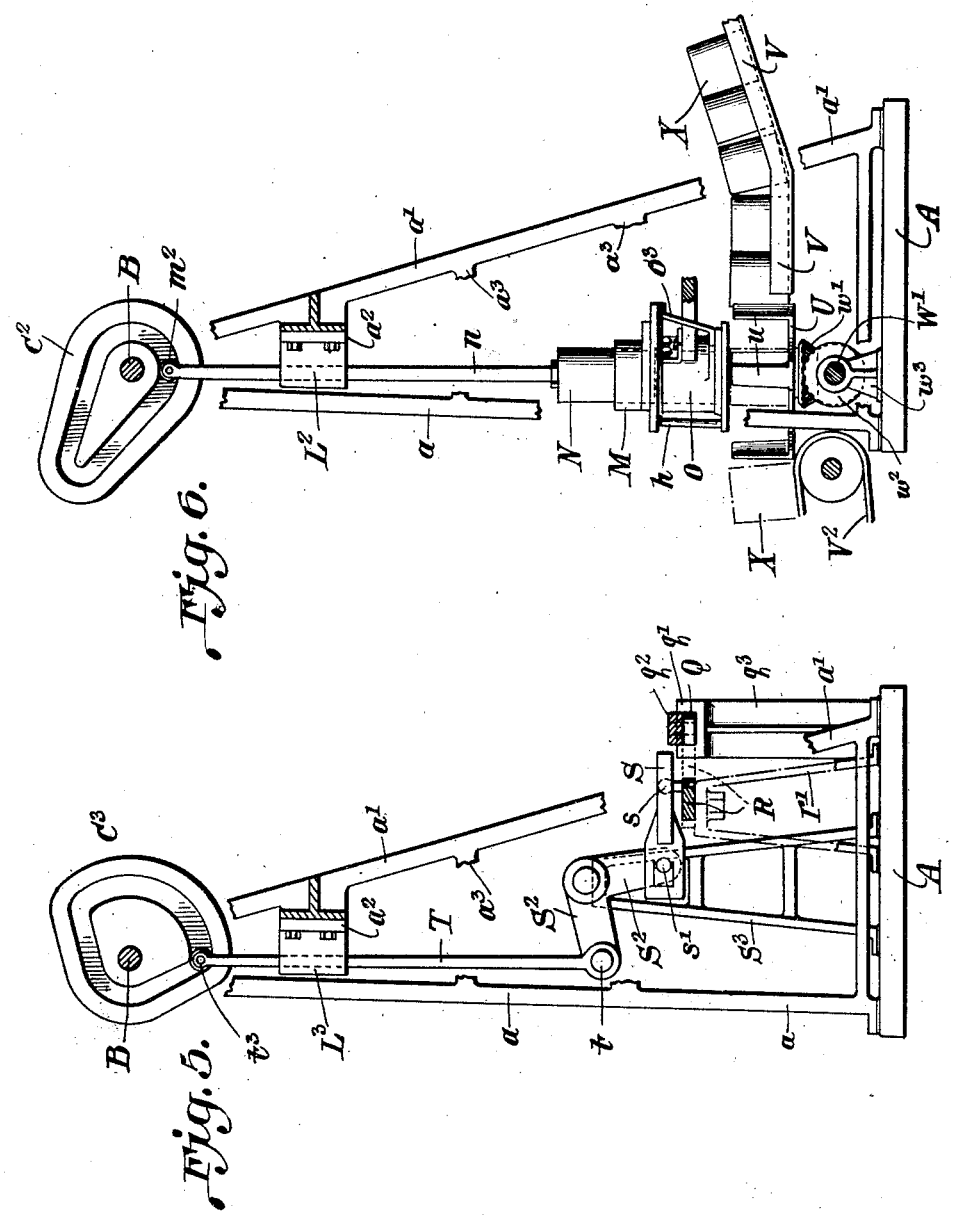

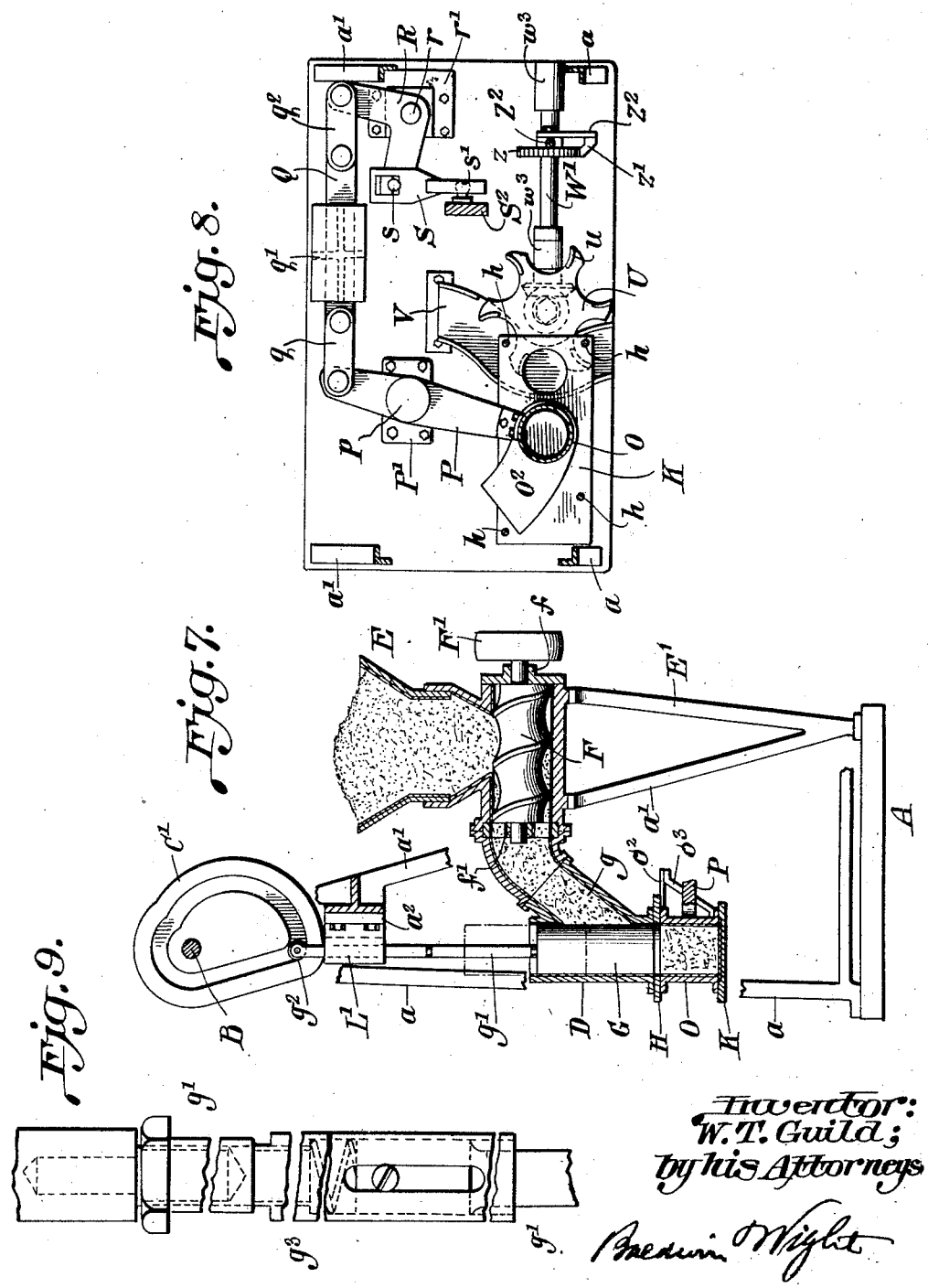

WILLIS T. GUILD, OF JACKSON, MISSISSIPPI.

CAN-FILLING MACHINE.

1,383,105.	Specification of Letters Patent.	Patented June 28, 1921.

Application filed November 29, 1920. Serial No. 427,186.

*To all whom it may concern:*

Be it known that I, WILLIS T. GUILD, a citizen of the United States, residing in Jackson, in the county of Hinds and State of Mississippi, have invented certain new and useful Improvements in Can-Filling Machines, of which the following is a specification.

This invention relates to can filling machines of the kind constructed to automatically fill cans with vegetables and other substances. Heretofore, so far as I am aware, no machine of this general class has been especially constructed to fill cans with cooked, peeled and otherwise prepared sweet potatoes which are of a soft, pasty and stringy nature and require particular treatment. This work, as far as I am aware, has heretofore been done by hand.

According to my invention, a mass of cooked, peeled and otherwise prepared potatoes is placed in a hopper which delivers to a feed screw in turn forcing the mass into a chamber in which operates a vertically reciprocating mold-filling plunger or ram which forces the mass contained in the chamber into a mold where it packs the charge in quantities of definite size and weight. The mold is carried by a lever mounted to oscillate about a vertical axis and the mold is moved horizontally from a position under the filling chamber into a position above a can carrier and below a can-filling plunger which is operated to force the charge of material out of the mold into a can below it. The cans are automatically fed step by step beneath the can-filling plunger and the mold is moved at suitable intervals from a position below the mold-filling plunger to a position above the can and beneath the can-filling plunger.

The mechanism is so arranged as to operate in unison and harmoniously at high speed. The mold oscillates between upper and lower frame plates and a definite amount of material is taken by the mold at each mold filling operation. The mold is provided with an extension or wing which closes the end of the mold-filling chamber when the mold is moved away from it. The metal parts which would otherwise come in contact with the prepared potatoes are lined with tin to comply with Government regulations and the plungers fit the mold and the cylinders in which they operate with the greatest accuracy, so that the cylinders are kept clean during the entire operation of the mechanism.

In the accompanying drawings:—

Figure 1 is a front elevation of a can filling machine embodying my improvements.

Fig. 2 is an elevation of the right-hand end of the machine.

Fig. 3 is a top plan view.

Fig. 4 shows a vertical section on the line 4—4 of Fig. 1.

Fig. 5 is a similar section on the line 5—5.

Fig. 6 shows a section on the line 6—6 of Fig. 1.

Fig. 7 is a similar section on the line 7—7.

Fig. 8 shows a horizontal section on the line 8—8 of Fig. 1.

Fig. 9 is a detail view of yielding devices forming part of the connecting rod of the mold-filling plunger.

The main supporting frame of the machine may be of any suitable construction, but preferably it comprises a bed plate A and side members each consisting of a front vertical member $a$ and a rear inclined member $a'$ connected at suitable intervals by cross pieces $a^3$. The side members are firmly secured to the bed plate in any suitable way. A cross piece $a^2$ connects the two side members of the frame near their upper ends and serves to support parts of the mechanism as will be hereinafter described. The upper ends of the parts $a$, $a'$ of each side member are brought together and support bearings $b$ for a horizontal shaft B carrying a drive pulley B' and four cams C', $C^2$, $C^3$, $C^4$ which are vertically arranged and grooved in their sides as indicated. These cams operate respectively on the mold-filling plunger, the can-filling plunger, the mold oscillating devices, and the can-feeding mechanism.

A cylinder D contains a chamber which receives the material from a hopper E arranged in rear of it. This hopper delivers to a horizontally arranged feed screw F which forces the material into a chute $g$ which delivers to the cylinder D below the mold-filling plunger when the latter is in its uppermost position. The screw is driven by a pulley F' and has its bearings at $f$, $f'$ as indicated.

The cylinder D is supported by a horizontally arranged table or plate H, in turn supported on posts $h$ over a plate K located some distance below it. $h'$ indicates a bracket or brace for holding the plate H steady and $k$ shows a similar brace for the plate K.

The hopper E and parts immediately associated therewith are supported on a brace bar E' extending from the bed plate upwardly.

The piston or plunger G is connected by a rod $g'$ with the cam C' by means of the groove and roller connection $g^2$ shown in Fig. 7. The upper end of the rod $g'$ is guided in a suitable guide bracket L' secured to the cross piece $a^2$. Preferably the plunger rod $g'$ is made in sections and has interposed between its upper and lower ends yielding devices $g^3$, in order that the material operated upon by the plunger may be given a yielding pressure when the mold is being filled.

The plate or table H extends to the right and supports a guide cylinder M in which operates a cam-filling plunger N, the rod $n$ of which is guided in a bracket $L^2$ secured to the cross piece $a^2$, and said rod has a roller and groove connection with the cam $C^2$ as indicated at $m^2$.

The mold O is located between the plates H and K and is adapted to move from a position beneath the mold-filling plunger to a position beneath the can-filling plunger. The mold has an opening through it as indicated in Fig. 7. It is carried by a lever P pivotally mounted at $p$ on a support P' rising from the bed plate. The plate H has an opening through it corresponding in size to the diameter of the chamber D and the diameter of the mold, but the plate K is closed beneath the mold while being open beneath the can filling plunger. The mold has an extension $o^2$ which at times closes the opening in the plate H beneath the plunger D. $o^3$ indicates braces for the extension or wing $o^2$.

The rear portion of the lever P is connected by a short link $q$ to a rod Q reciprocating in a guide $q'$ on top of the supporting frame $q^3$ and connected by a short link $q^2$ with a horizontally arranged bell crank lever R pivotally mounted at $r$ on a support $r'$. The bell crank lever R is connected at $s$ by a loose joint with a horizontally arranged link S in turn connected at $s'$ with a bell crank lever $S^2$ pivoted to move about a horizontal axis in bearings on top of a supporting frame $S^3$ rising from the bed plate. The bell crank lever $S^2$ is joined at $t$ to a vertically disposed rod T guided in the bracket $L^3$ and having a roller and groove connection $t^3$ with the cam $C^3$. By this mechanism the mold is oscillated back and forth from the mold-filling chamber D to the guiding chamber F of the can filling plunger and vice versa.

The can carrier U comprises a horizontally arranged circular frame, the arms $u$ of which are arranged to engage cans X fed through an inclined chute or guide way V in any suitable way. The can carrier is so operated step by step as to carry the cans one at a time beneath the can-filling plunger N to receive material from the mold at the proper time.

The can carrier is supported at W and revolves about a vertical axis. It carries a beveled pinion $w'$ engaging a corresponding pinion $w^2$ on a horizontal shaft W' mounted in bearings $w^3$. The shaft carries a ratchet wheel $z$ engaging a pawl $z'$ carried by an arm $z^2$ pivoted on the shaft W' and connected by a link $z^3$ with a connecting rod $Z^2$ having a groove and roller connection $z^4$ with the cam $C^4$. The rod $Z^2$ is guided in a guide bracket $L^4$ attached to the cross piece $a^2$. The mechanism is so operated as to give a step by step movement to the can carrier in the manner described, a can being moved to a position beneath the can-filling plunger just before said plunger is moved downward to force a charge of material from the mold. The cans are guided into engagement with the can carrier by suitable guides and the cans are delivered when filled to any suitable receiver, as to an endless belt $V^2$ which is adapted to convey the filled cans to other apparatus.

As is well known when sweet potatoes are prepared for being canned, they are usually steamed sufficiently to enable the skins to be removed. Inasmuch as some of the potatoes are quite large, as much as six inches in diameter, and some are very small, say two inches in diameter and inasmuch as yams are considered the same as sweet potatoes or their equivalents, and as these are sometimes as large as eight inches in diameter, the small potatoes by the steaming process will be cooked to some extent, sometimes quite thoroughly, while the larger potatoes will not be cooked on the inside and will often be quite hard. Therefore, it is customary to cut the large potatoes to a size two inches in diameter or across. In this condition the potatoes are put in the hopper E, shown in the accompanying drawings, and are acted upon by the screw which mixes the large and small parts of the mass and to some extent crushes the larger pieces so that the material when it enters the filling chamber is in a mashed condition although there are often some solid pieces, but this is not objectionable.

The mold-filling plunger operates on material of this sort in the filling chamber, which should contain below the filling plunger, when the latter is lifted, enough or somewhat more than enough to fill a can. When the mold filling plunger descends it forces the mass into the mold and completely fills it, the mold chamber being as before mentioned exactly of the same dimensions as a can to be filled. The plunger G exactly fills the filling chamber so as to wipe it clean at every operation, and as indicated in the drawings, the chamber D as well as the mold chamber is lined with tin to comply with Federal and State regulations.

After the mold is thus filled, it is swung over to a position above the can carrier and above a can mounted therein and just below the can-filling plunger. The can-filling plunger descends at the proper time and it has a movement sufficient to force all the material out of the mold chamber into a can so that the material completely fills the can up to its very top edge. The can thus filled is removed by the can carrier from beneath the can-filling plunger and may be delivered to an endless belt carrier as shown in the drawings. It will be observed by reference to the drawings that not only is the mold and its filling chamber lined, but the hopper, the feed screw, and all other parts which come in contact with the material being canned are properly lined, preferably with tin.

The potatoes when they are thus packed in the cans are not sufficiently cooked. After the cans are filled, they are passed through a heater which drives the air out of the mass of potatoes. This is done before the caps or covers are put on the cans. After being thus heated, the cans are capped and sealed and then they are again steamed sufficiently to thoroughly cook the potatoes. This is the usual process and forms no part of my invention.

The details of construction shown for operating the parts have been found to be efficient, but may be somewhat varied. The novel features of my invention are hereinafter specified.

I claim as my invention:

1. A can filling machine comprising a mold filling chamber open at the side, a vertically reciprocating plunger operating in said chamber, a mold mounted to oscillate in an arc below said mold filling chamber, a can carrier, a vertically reciprocating plunger operating in said mold to force material therefrom into a can, means for operating the two plungers, means for swinging the mold from a position under the mold filling chamber to a position above a can in the carrier and below the can filling plunger, and means for giving a step-by-step movement to the can carrier.

2. A can filling machine comprising a mold filling chamber open at the side, means for forcing material through the side opening of the mold filling chamber, a vertically reciprocating plunger operating in said chamber across said side opening, a mold mounted to oscillate in an arc below said mold filling chamber, a can carrier, a vertically reciprocating plunger operating in said mold to force material therefrom into a can, means for moving the mold filling plunger to alternately open and close the side opening in the mold filling chamber and to force material into the mold, means for reciprocating the can filling plunger to at the proper time force material from the mold into a can, means for swinging the mold from a position under the mold filling chamber to a position above a can in the carrier, and below the can filling plunger, and means for giving a step-by-step movement to the can carrier.

3. A can filling machine comprising a mold filling chamber, a vertically reciprocating plunger operating therein, a hopper for material operated upon, means for forcing material from the hopper into the mold filling chamber below the plunger, a rotary can carrier, means for delivering cans thereto, a can filling plunger, means for moving the can carrier step-by-step to present cans one at a time below the can filling plunger to receive material from the mold, and means for oscillating the mold from a position beneath the mold filling chamber to a position above a can in the carrier and below the can filling plunger.

4. A can filling machine comprising a mold filling chamber, a vertically reciprocating plunger operating therein, a mold mounted to move in an arc below the mold filling chamber and having an extension or wing adapted to close the lower end of said chamber when the mold is withdrawn therefrom, a can carrier, a plunger adapted to force material from the mold into a can, means for operating the two plungers, means for swinging the mold from a position under the mold filling chamber to a position above a can in the carrier, and below the can filling plunger, and means for giving a step-by-step movement to the can carrier.

5. A can filling machine, comprising a main frame horizontally arranged, plates supported by the frame and spaced apart, a mold-filling chamber supported by the upper plate, a plunger operating in said chamber, a mold mounted to move in an arc below the mold-filling chamber and between said plates, a can carrier, a plunger adapted to force material from the mold into a can, means for operating the two plungers, means for moving the mold from a position under the mold-filling chamber to a position above a can in the carrier and below the can-filling plunger, and means for giving a step by step movement to the can carrier.

6. In a can filling machine, the combination of a main frame, a cam shaft mounted in bearings at the upper end thereof, cams on said shaft for operating the mechanism, a mold-filling plunger operatively connected with one of the cams, a can-filling plunger operatively connected with another cam, an oscillating mold adapted to move from a position below the mold-filling plunger to a position above a can, connections between said mold and one of the cams on the cam shaft by means of which the mold is moved from a position below the mold-filling plunger to a position above a can and below the can-filling plunger, a can carrier mounted to turn about a vertical axis, and connections between said can carrier and one of the cams on the cam shaft by which the can carrier is moved step by step.

7. In a can filling machine, an oscillating mold having an extension or wing, a lever mounted to turn about a vertical axis, a rod having a link connection with said lever, a horizontally arranged bell crank lever connected to said rod, another bell crank lever mounted to turn about a horizontal axis and having a link connection with the first mentioned bell crank lever, a rotary cam, and connections between said cam and the second mentioned bell crank lever for giving an oscillating movement to the mold.

I testimony whereof, I have hereunto subscribed my name.

WILLIS T. GUILD.